United States Patent [19]

Peer

[11] Patent Number: 5,577,196
[45] Date of Patent: Nov. 19, 1996

[54] INTELLIGENT DIGITAL SIGNAL HITLESS PROTECTION SWITCH

[75] Inventor: Daniel D. Peer, Overland Park, Kans.

[73] Assignee: Sprint Communications Co. L.P., Kansas City, Mo.

[21] Appl. No.: 565,223

[22] Filed: Nov. 30, 1995

Related U.S. Application Data

[63] Continuation of Ser. No. 44,348, Apr. 7, 1993, abandoned.
[51] Int. Cl.$^6$ .................... H04J 3/14; H04L 1/00
[52] U.S. Cl. .................... 395/783.19; 371/11.2; 371/68.2; 371/8.2; 370/16
[58] Field of Search .............. 370/16, 108, 105.1; 371/8.2, 11.2, 68.2; 395/182.02

[56]  References Cited

U.S. PATENT DOCUMENTS

| | | | |
|---|---|---|---|
| Re. 33,900 | 4/1992 | Howson | 370/105 |
| 4,119,815 | 10/1978 | Frankfort et al. | 179/175.3 |
| 4,271,513 | 6/1981 | Maejima et al. | 371/20.5 |
| 4,348,554 | 9/1982 | Asmuth | 179/18 |
| 4,486,882 | 12/1984 | Piret et al. | 371/45 |
| 4,625,314 | 11/1986 | Witte | 371/68 |
| 4,674,085 | 6/1987 | Aranguren et al. | 370/85.2 |
| 4,774,703 | 9/1988 | Force et al. | 370/16 |
| 4,780,869 | 10/1988 | Engdahl et al. | 370/16 |
| 4,794,604 | 12/1988 | Gorshe | 371/57 |
| 4,819,225 | 4/1989 | Hochstein | 370/16 |
| 4,835,763 | 5/1989 | Lau | 370/16 |
| 4,847,837 | 7/1989 | Morales et al. | 371/8 |
| 4,852,103 | 7/1989 | Fujimura | 371/55 |
| 4,924,500 | 5/1990 | Lewis et al. | 379/201 |
| 4,943,999 | 7/1990 | Ardon | 379/221 |
| 4,964,120 | 10/1990 | Mostashari | 370/16 |
| 4,972,415 | 11/1990 | Walter et al. | 371/36 |
| 4,993,014 | 2/1991 | Gordon | 370/16 |
| 4,993,015 | 2/1991 | Fite, Jr. | 370/16 |
| 5,115,449 | 5/1992 | Lockyer et al. | 375/211 |
| 5,153,578 | 10/1992 | Izawa | 371/8.2 |
| 5,155,678 | 10/1992 | Fukumoto et al. | 395/600 |
| 5,187,711 | 2/1993 | Hodohara | 371/8.2 |
| 5,200,950 | 4/1993 | Foglar | 370/16 |
| 5,241,534 | 8/1993 | Omuro et al. | 371/8.2 |
| 5,285,441 | 2/1994 | Bansal et al. | 370/16 |
| 5,301,184 | 4/1994 | Uriu | 370/16 |
| 5,315,581 | 3/1994 | Nakano et al. | 370/16 |
| 5,329,521 | 7/1994 | Walsh et al. | 370/16 |
| 5,335,232 | 8/1994 | Suzuki et al. | 371/20.4 |
| 5,343,477 | 8/1994 | Yamada | 395/182.02 |
| 5,347,271 | 9/1994 | Iwasaki | 340/827 |

OTHER PUBLICATIONS

"The Book on ESF", Verilink Corporation, 1986.
Correspondence from Tai Chen, a Vice President of Digital Transmission Systems, Inc. to Dan Peer, applicant, Feb. 9, 1993.

*Primary Examiner*—Jack B. Harvey
*Assistant Examiner*—Paul R. Myers
*Attorney, Agent, or Firm*—Harley R. Ball; Michael J. Setter

[57]  ABSTRACT

A system (400), in its receiver aspect (e.g. 402), interconnects a terminal link (451) to either a first autonomous link (421) or a second autonomous link (431) depending upon the error conditions on the first and second links. The second link redundantly propagates the same data stream as the first link both in Extended Superframe Format (ESF) as generated in a transmitter (401) of the system. The two independent data streams are aligned in the receiver to compensate for the propagation delay difference between these two links. A predetermined number of first and second ESF superframes are stored in buffers during calculation of logic errors, if any, in each of the ESF superframes using the check data in each ESF superframe. The terminal link is then coupled to the buffer which stores the ESF superframes which are error-free or which are selected based on the better recent error performance of the first autonomous link (421) or the second antonomous link (431), thereby delivering to the end-user, served by the terminal link, a data stream which is substantially, if not completely, error-free.

37 Claims, 5 Drawing Sheets

100

200

5,577,196

INTELLIGENT DIGITAL SIGNAL HITLESS PROTECTION SWITCH

CROSS-REFERENCE TO RELATED APPLICATION

This application is a continuation of application Ser. No. 08/044,348, filed Apr. 7, 1993, now abandoned.

This application describes material that was described and claimed in my co-pending United States patent application entitled "Error Correction and Channel Restoration Apparatus for DS1 Digital Links" filed simultaneously herewith, assigned Ser. No. 08/044,327, now U.S. Pat. No. 5,506,956 and which has been assigned to the present assignee hereof.

FIELD OF THE INVENTION

This invention relates generally to digital communication networks and, more specifically, to protection circuitry and a concomitant methodology for providing substantially error-free communication links in support of DS1 and higher speed services.

BACKGROUND OF THE INVENTION

Since the introduction of digital transmission into telecommunications networks in the 1960's, a sophisticated digital transmission network hierarchy has evolved based on the so-called digital signal at the first level, that is, DS1. It is necessary to trace pertinent aspects of this evolution so as to provide a context for presenting and discussing the prior art as well as to set forth with specificity the limitations of the prior art.

When first introduced into telecommunications networks, digital transmission was based on the propagation of digital signals in the now well-known T1 carrier format. In this format, 24 voice-frequency signals are sampled and then multiplexed into a digital bit stream, thereby forming 24 autonomous voice-frequency channels. All 24 channels are grouped together to form a 192-bit data group. For synchronization, every group of 192 bits is preceded by a framing bit; these 193 bits comprise a T1 frame. Each voice-frequency channel is allocated 8 bits in the 193-bit frame; these 8 bits represent one encoded sample of a particular voice signal as well as signalling information. Thus, a T1 frame is composed of 192 bits of information and one overhead framing bit. Consequently, since the sampling rate of the voice-frequency signal is 8 kHz, meaning each encoded sample of the voice-frequency signal must be updated 8000 times a second, the transmission rate of the T1 system is 1.544 Mbits/sec. To support two-way communication, two digital bit streams are generated—one for each direction of transmission. Each bit stream is transmitted over a corresponding unidirectional link typically composed of a wire-pair cable and interposed repeaters so that a complete T1 system utilizes two wire-pair cables.

The original T1 terminals used at the ends of the wire-pair span to multiplex the 24 voice-frequency signals were designated D1 channel banks. D1 frame format used every 193rd bit totally for frame synchronization. Seven bits in each frame were used for customer data with one additional bit being used for signalling. As advances in technology evolved, other framing formats were devised to improve the performance of the underlying T1 system. For example, the D2 frame format introduced the so-called superframe wherein 12 contiguous T1 frames having a unique 193rd bit sequence were repeated once every 12 frames. The D2 framing format also introduced "robbed bit" signalling. In the D2 framing format, only one bit in frames 6 and 12 was used for signalling. The remaining bits were allocated to encode customer voice. The use of all eight bits for voice in 10 out of 12 frames resulted in substantial improvement of voice transmission quality compared to the D1 framing format. D1D, which followed D2, made the superframe concept "backward compatible" with the original D1 type channel banks. The last frame format to utilize a 12-frame superframe concept was the D4 frame format. The most recent framing format, designated the Extended Superframe Format (ESF), dramatically improves the capabilities of T1 systems and affords the opportunity to perform diagnostics on working T1 systems without disrupting communications. Because of technology improvements, fewer bites are now required to maintain frame synchronization as compared to the D4 banks. In ESF, a 24-frame sequence is used for framing, in-service end-to-end performance monitoring, and facility data link (FDL) that allows communication on the T1 link independent of the customer data traffic. The fundamentals of ESF will be discussed in more detail shortly after the types of errors that arise in a T1 system are discussed.

Using the T1 format as a basic building block, a hierarchy of digital networks has evolved in North America. For example, in addition to T1 which supports the DS1 hierarchy level, there are the T2 and T3 formats which operate at 6.312 Mbits/second and 44.736 Mbits/second, respectively. T2 and T3 formats support the DS2 and DS3 hierarchy levels. A T2 format has four times the capacity of a T1 format or 96 voice-frequency signals. A T3 format has 28 times the capacity of a T1 format. Thus, the notion of digital hierarchy should be distinguished from the underlying physical transmission systems supporting the hierarchy. For example, the first digital hierarchical level, DS1, is implemented with the 1.544 Mbit/sec. Today, T1 transmission systems deploy either the latest D4 frame format or the ESF format. The service provided by the first hierarchical level is generally referred to as DS1 service.

A T1 digital bit stream, that is, a stream of T1 frames, must follow certain propagation rules. For instance, when bits of the T1 signal are propagated over the communication medium, one rule requires that each "1" bit must correspond to a pulse having a polarity opposite to the polarity of the previous "1" bit—this format generates a bipolar signal composed of a stream having alternating positive and negative electrical pulses. For each "0" bit, no electrical pulse is propagated. Such a bipolar signal leads to spectral efficiency, and also results in a frequency spectrum lacking a DC component, thereby requiring only AC-coupled circuitry. Another rule requires that, to maintain signal synchronization, no more than a certain number of "0" bits can be transmitted consecutively. A logic error occurs if a "1" bit appears where a "0" bit should occur, and vice versa. A format error occurs when there is a violation in the bipolar nature of the pulse stream, or an error in the framing bits, or excessive "0" bits occur.

For all frame formats existing prior to the introduction of the ESF, testing of in-service links was limited to checking for format errors. The basic assumption was that any logic error caused a format error. But it can be readily shown that only certain logic errors cause format errors. For instance, if two consecutive "1" pulses in the bit stream, say a positive pulse followed by a negative pulse, are converted to "0" bits, then no format errors occur since there are no bipolar violations. However, two logic errors have occurred. In addition, a typical T1 circuit is likely to contain several bipolar signal sources. For example, a higher order M13 multiplexer puts several T1 systems into a fiber link. The T1 ports on the M13 multiplexer are a source for bipolar signals and must "correct" any bipolar violations from other parts of the transmission path because fiber does not carry bipolar signals. As a result, a channel bank at the other end of the T1 link can monitor bipolar violations, but this will reveal only errors that occurred in the last leg of the path from the last M13 multiplexer (i.e., bipolar pulse source) to the channel bank. Thus, end-to-end error performance monitoring cannot be provided with D4 framing format. Obviously there was a need to develop a technique which could accurately detect end-to-end DS1 performance of an in-service T1 system.

This aforementioned need was satisfied by the development of the ESF concept. With respect to the principles of ESF, each superframe is defined as encompassing 24 T1-type frames, so each superframe is composed of 24×193=4632 bits, including 4608 information carrying payload bits and 24 synchronization bits. The framing bit of a conventional T1 system, i.e., the 193rd bit, is conveyed at an effective rate of 8000 bps. Accordingly, the 24 bit positions in the superframe occupied by the 193rd bit in each of the 24 underlying frames also are conveyed at the same rate of 8000 bps.

However, because of the aforementioned advances in technology, it is only necessary to use six of the 24 bits for actual superframe synchronization. Thus, if the 24 bits occupied by the 193rd bit are extracted and arranged serially to create a framing bit segment, then the convention is that superframe synchronization bits are conveyed by every fourth bit in the framing bit segment, that is, in the superframe synchronization sub-segment. The superframe synchronization bits have a fixed bit pattern which conventionally has been set at 001011. It is important to reiterate at this point that the framing bit segment is actually an overhead portion of the ESF superframe (that is, each of the other 192 bit positions in each of the 24 frames defining the superframe is used to carry user information data and signalling; this data is unaffected by what is being conveyed in the framing bit segment).

The remaining 18 bits in the frame segment are partitioned into a check sub-segment of 6 bits and a facility data link (FDL) sub-segment of 12 bits. The check sub-segment is of particular relevance to the present invention.

As indicated above, the primary reason for devising the ESF technique was to enable T1 users/suppliers to accurately measure end-to-end error performance of a T1 system while the system is on-line, that is, without interrupting the propagation of the T1 digital streams. This is accomplished by applying a coding theory technique, called Cyclic Redundancy Codes (CRC), to each ESF. With the CRC technique, all 4608 payload bits in each complete ESF superframe can be checked for logic errors. In essence, for the particular CRC technique used in ESF (called CRC-6), six bits are generated for each ESF superframe; these six bits are indicative of the actual 4632 bits comprising a given superframe. Computation of the six check bits involves nothing more than division and modulo-2 arithmetic. For example, assume that the ESF bit stream, rather than being 4632 bits long, is 10 bits long and the pattern is 1010101010, which has a decimal equivalent of 682. This decimal equivalent is divided by 64 (2⁶=64, that is, 6 bits are dedicated to the check sub-segment), resulting in a quotient of 10 and a remainder of 42. The quotient is ignored, and the six-bit binary equivalent of the remainder, i.e., 42, namely, 101010, are the check bits transmitted in the next superframe.

To visualize the flow of bits in a temporal sequence, consider a time sequence of two ESF superframes designated the first ESF superframe and the second ESF superframe which follows the first ESF superframe in time. The six check bits computed for the first ESF superframe are entered into the check sub-segment of the second ESF superframe and transmitted to the receiving end of the T1 system. At the receiving end, the CRC-6 of the first ESF superframe is dynamically computed. Obviously all 4632 bits of the first ESF superframe are needed to compute the check bits, so the CRC-6 cannot be completed until all bits arrive at the receiving end. Once computed, the CRC-6 check bits can then be compared to the check sub-segment arriving in the second ESF superframe. If there is a match, then it is concluded with a high degree of confidence that there were no errors in the first superframe. If there is no match, this is normally taken to mean that at least one error occurred in the first superframe. (Of course, the check bits in the second superframe may have been corrupted, but the probability of this occurring, i.e., errors in the six bit positions, is much less than the occurrence of errors in 4608 payload bit positions.) The unfolding nature of error checking for the general case is now readily discernible: the CRC-6 bits of a given superframe are transmitted in the check sub-segment of the next superframe following the given superframe.

Representative of prior art devices and equipment which exploit the capabilities of error detection using CRC-6 with ESF superframes is the Automatic Protection Logic Switch (APLS) available from the Verilink Corporation, San Jose, Calif. The ALPS checks a working T1 line for logic errors, and when a preset Bit Error Rate (BER) threshold is reached, or an active link outage is detected, traffic is automatically switched from the active T1 link to a standby T1 link. Such an arrangement is deficient, however, because the protection link is activated only after errors occur and the BER threshold is reached. Consequently, all errors which occurred in the active link prior to the activation of the protection link reach the end-user. Also, a difference typically occurs in the propagation delay between the active and protection links. When the protection link is activated, the end-user will encounter a "hit" in the data stream; this "hit" is usually in the form of a gap in the data stream or repeated segment in the data stream.

There is no teaching or suggestion in the art, of synchronized digital transmission, of an arrangement and concomitant methodology which utilizes the protection DS1 link to correct errors in the active DS1 link and to synchronize active and protection DS1 links to achieve "hitless" protection switching when the active DS1 link fails—as distinct from the sequence in the prior art of error-detection first, then subsequent protection switching to the alternate facility only after a period of delay. Furthermore, there is no teaching or suggestion in the art treating higher speed systems such as DS3 which also achieve "hitless" protection switching.

SUMMARY OF THE INVENTION

These limitations and other shortcomings and deficiencies are obviated, in accordance with the present invention, by advantageously transmitting the same digital signal data streams (e.g. DS1 and DS3) over two parallel communication links, and by selecting in a receiver, on a superframe basis, the superframe conveying error-free data prior to delivery to an end user.

In accordance with the broad aspect of the present invention, receiver circuitry is arranged to interconnect on a superframe basis an output port to: either a first autonomous communication link which propagates a stream of superframes in Extended Superframe Format (ESF); or a second autonomous link which propagates the same stream of superframes as the first link, wherein the interconnection is controlled in response to error calculations on the two links. Because the links generally have different propagation delays, the data stream which arrives first at the receiver because of a shorter propagation time on one of the links is delayed in order to align the data streams arriving over the links. Both information and framing bits (i.e., all 193 bits) are utilized to align the first ESF superframes and second ESF superframes. The first and second ESF superframes are separately stored in first and second buffers. In parallel with storing the superframes in the buffers, the superframes are processed to detect the presence or absence of errors in each of the first ESF superframes or presence or absence of errors in each of the second ESF superframes using the CRC-6 check data contained in the ESF superframes and CRC-6 calculations on the first and second ESF superframes, respectively. Finally, the output port, which is initially connected to, say, the first link, is switched to the second buffer to select an error-free ESF superframe upon the detection of errors in the ESF superframe in the first link, and the absence of errors in the ESF superframe in the second link to select and thereby provide error-free ESF superframes to the output port. Because the superframes are buffered during error calculations, it is possible to switch "hitlessly" to the link having an error-free condition during each ESF superframe interval. If both links have errors in a given superframe, errors cannot be corrected. In this case, the receiver selects the ESF superframe from the link which has had a better recent error performance.

To achieve hitless protection switching in higher speed systems, such as DS3 systems, these systems may also be arranged through use of my invention, with check data bits in an overhead data stream and substantially identical buffering along with check data computation, all as broadly described above.

BRIEF DESCRIPTION OF THE DRAWINGS

The organization and operation of this invention can be clearly understood from considering the following detailed description in conjunction with the accompanying drawings in which.

DETAILED DESCRIPTION

To place the detailed description of the present invention in perspective and thereby highlight the departure from the art as disclosed and claimed herein, it is both instructive and informative to first gain a basic understanding of the telecommunications environment in which the present invention operates by presenting certain foundational principles concerning a conventional DS1 service. Accordingly, the initial part of this detailed description discusses pertinent specifics of the prior art. This approach has the advantage of introducing notation and terminology which will aid in elucidating the various detailed aspects of the present invention. After this description, the circuitry aspects of the present invention, as well as the concomitant methodology, are presented with specificity.

Conventional Arrangements

Figure 1:
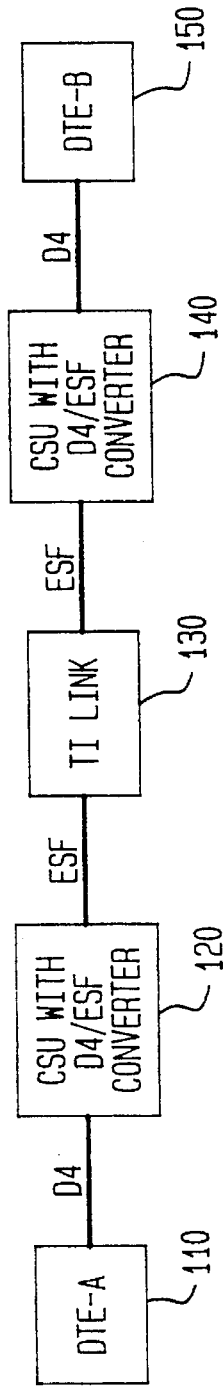
FIG. 1 illustrates, in high-level block diagram form, a prior art network providing DS1 service using a single T1 link and channel service units (CSU's) to interface a T1 facility.

As depicted in high-level block diagram form in FIG. 1, prior art network 100 connecting Digital Transmission Equipment 110 at End-A (DTE-A) with Digital Transmission Equipment 150 at End-B (DTE-B) includes a cascade of: Channel Service Unit (CSU) with D4/ESF (Extended Superframe Format) converter 120; single T1 link 130; and Channel Service Unit (CSU) with D4/ESF converter 140. Each CSU 120 or 140 is a device which forms an interface between a public network (T1 link) and an end-user to mitigate such disturbances as lightning transients and end-user equipment power outages. Typically, the D4/ESF converter is an integral part of the CSU. Network 100 represents one of the basic ways of implementing ESF in the T1 network today, namely, by retrofitting an existing T1 system with a conversion device that converts a digital stream having a D4 frame format to a digital stream implementing ESF. The CSU is such a conversion device. Framing formats D1, D2, D1D, and D3 are no longer used in the industry. On one side of a CSU, say CSU 120, the digital stream transceived by DTE-A 110 is shown as having "D4 Framing". On the other side of CSU 120, the digital stream is in ESF form. The framing re-formatting is transparent to T1 link 130; this link typically comprises two wire-pair cables and repeaters.

Figure 2:
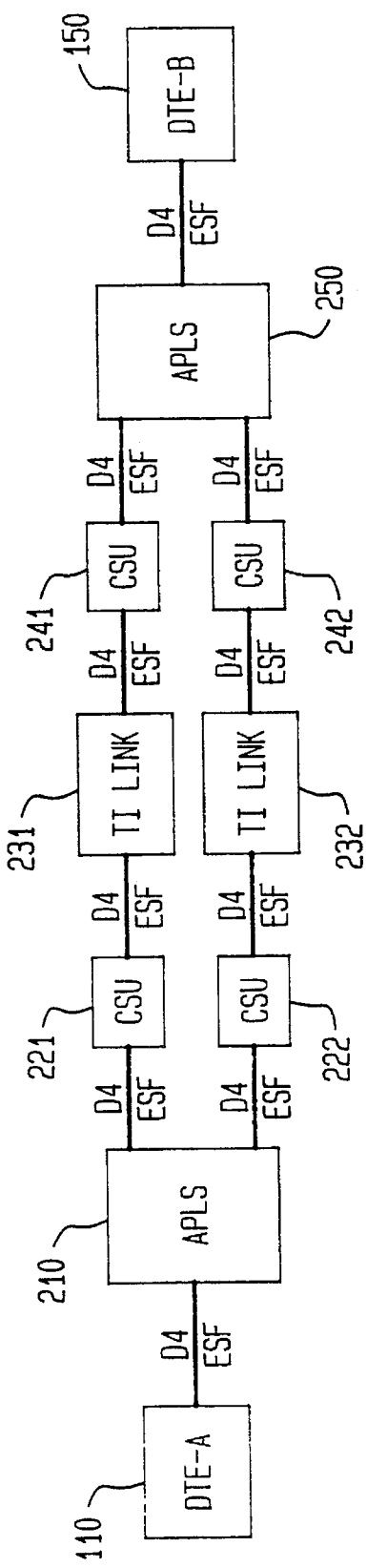
FIG. 2 illustrates, in high-level block diagram form, a prior art network providing DS1 service using both active and backup T1 links.

Another prior art arrangement, utilized by many service providers, improves reliability of network 100 by utilizing two DS1 links (routes) and a DS1 switch called Automatic Line Protection Switch (ALPS). However, the improved system, while providing higher reliability DS1 service, still allows errors to reach an end-user. To explain the improved system, reference is initially made to FIG. 2. Prior art network 200 connecting Digital Transmission Equipment 110 at End-A (DTE-A) with Digital Transmission Equipment 150 at End-B (DTE-B) includes a cascade of: ALPS 210; two parallel DS1 routes connected to APLS 210, wherein the first DS1 route is composed of CSU 221, T1 link 231, and CSU 241, and wherein the second DS1 route is composed of CSU 222, T1 link 232, and CSU 242; and APLS 250 which connects the two parallel DS1 routes. One T1 link, (e.g., link 231), is an active link, whereas the other link (e.g., here link 232) is a standby link. As the names imply, the active link is the link actually delivering the digital stream between APLSs 210 and 250, whereas the standby link, although propagating the digital stream, does not deliver its stream to the APLSs for processing. However, the standby link may readily deliver the digital data stream in place of the active link whenever necessary. To exemplify the interaction between the active and standby links, reference is now made to FIG. 3.

Figure 3:
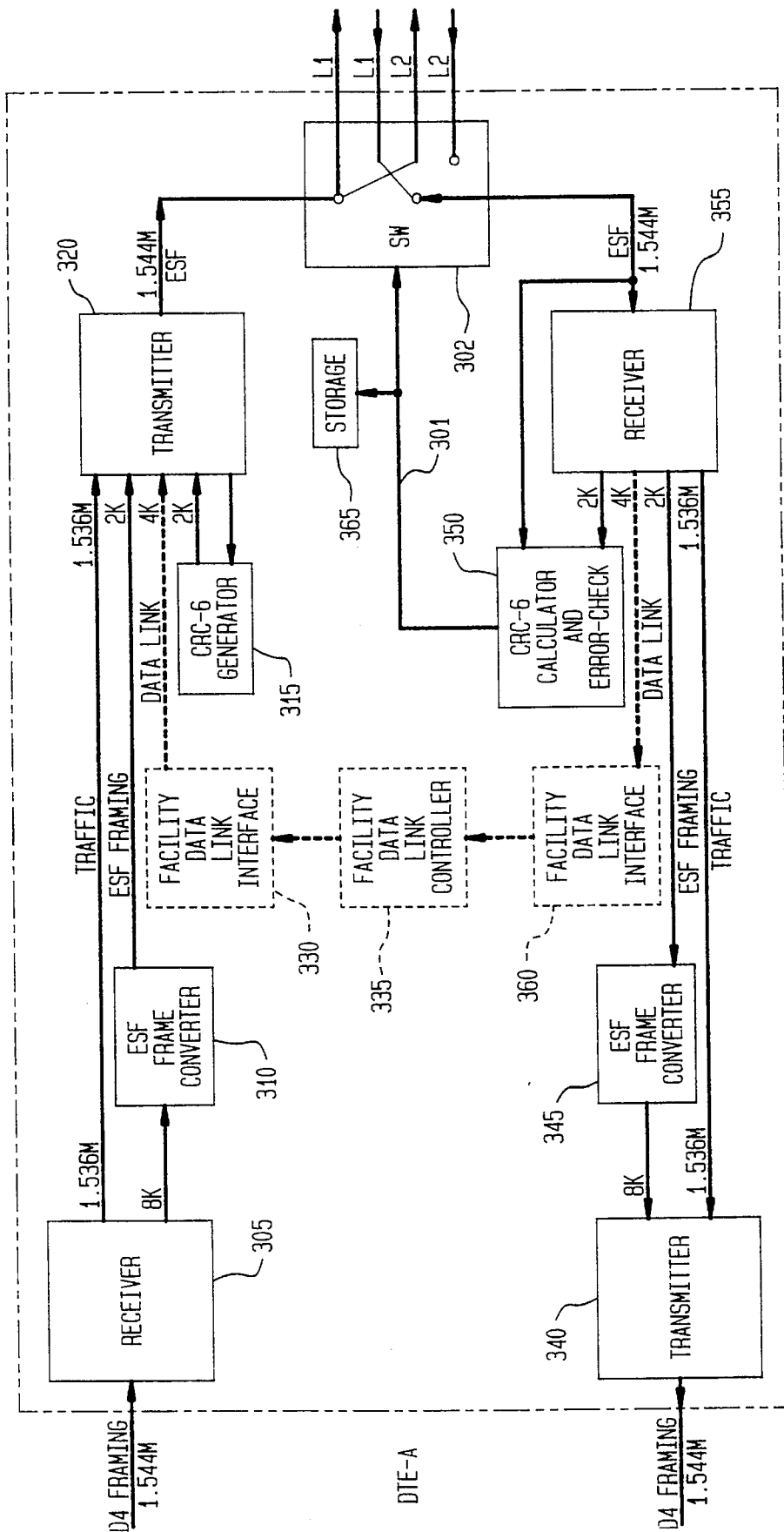
FIG. 3 is a block diagram of a APLS unit suitable for deployment in the system of FIG. 2.

The block diagram of APLS 210 (APLS 250 is essentially the same) in FIG. 3 illustrates aspects of the protection process. Receiver block 305 receives unidirectionally transmitted digital stream from DTE-A; illustratively, presuming D4 to ESF conversion is to be effected, this stream has frame format D4 and operates at 1.544 Mbits/sec (1.544M). Block 305 produces two separate data streams, namely, a digital "traffic" stream (also known as the payload stream) operating at 1.536M and an overhead bit stream operating at 8K bits/sec (8K). The traffic stream is generated from the 192 bit positions of the underlying 24 multiplexed signals, whereas the overhead bit stream is extracted from the 193rd framing bit position of each T1 frame. ESF frame converter 310 utilizes 2K of the 8K overhead bit stream to form superframe synchronization information in the ESF format, that is, successive bits in bit pattern 001011 are placed in the 193rd bit (overhead bit) position in frames (4,8,12,16,20,24) of the ESF superframe. CRC-6 generator 315 has, as its input, the ESF digital stream produced by receiver block 320, and generator 315 calculates the six check bits for propagation over another 2K of the 8K overhead segment allocated to the CRC-6 bits. The remaining 4K of the 8K overhead segment is allocated to the facility data link (FDL) bits provided by facility data link interface 330; facility data link interface 330 operates in response to facility data link controller 335. Facility data link interface 330 and controller 335 are shown as dashed since they are not pertinent to the present invention; they are mentioned, however, so the discussion about bits occupying the 8K overhead bit stream is self-contained and complete. Transmitter block 320 transforms the four parallel input channels, namely, the traffic, the superframe synchronization bits, the CRC-6 check bits, and the facility data link information, into a digital stream in ESF format. This stream is emitted from block 320 at the rate of 1.544 MB/sec for simultaneous propagation over the outgoing portions of T1 links 231 and 232 (L1 and L2). It is important at this point to reiterate that the six CRC-6 bits for a given ESF superframe are entered into the CRC-6 bit positions of the next ESF superframe; this functionality is effected by block 320.

The other unidirectional half of APLS 210 operates to receive information from the active T1 link, say link 231 (L1), in ESF format; this received information serves as an input to receiver block 355. Block 355 operates to convert the 1.544M ESF serial data stream into four separate streams—traffic at 1.536M, superframe synchronization bits at 2K, CRC-6 check bits at 2K, and facility data link information at 4K. Both the ESF data stream arriving at block 355 and the CRC-6 check bit stream derived from block 355 for each given ESF superframe are inputs to CRC-6 calculator and error-check block 350. In block 350, the CRC-6 check bits of each appropriate ESF superframe is computed and compared to the corresponding CRC-6 check bits arriving in the next ESF superframe. Errors are detected and information about the fidelity of transmission is stored in storage device 365; this error information is available to the service provider for administrative purposes, such as troubleshooting the system if the errors are outside of prescribed limits. The data link information is delivered to facility data link controller 335, via facility data link interface 360; again this path is shown only for completeness. ESF framing information arriving on the 2K line is fed to ESF frame converter block 345. The output of block 345 is a digital stream at 8K which is compatible with the D4 framing format of DTE-A. To generate the signal for DTE-A, transmitter block 340 merges the 1.536M traffic stream with the 8K output of frame converter 345.

Switch 302 operates under control of either facility error performance information emitted by calculator block 350 via lead 301, or facility outage such as loss of signal, i.e., yellow alarm AIS signal which is detected by switch 302 itself. Also, switch 302 serves to terminate both the active T1 link (link 231), shown as being composed of the two L1 unidirectional paths, as well as the standby T1 link (link 232), shown as being composed of the two L2 unidirectional paths. As shown, switch 302 connects the ESF stream from transmitter 320 to both the outgoing paths of the L1 link and the L2 link, but only the incoming path of the L1 link is connected to receiver 355 to deliver the incoming ESF stream. By way of an operational flow, whenever errors are detected on the incoming ESF stream by calculator 350, and a certain predetermined error threshold is reached, a signal indicative of this condition is propagated to switch 302, via lead 301. This signal operates switch 302 to disconnect active link L1 and then connect to standby link L2 to derive the incoming signal. It is important to realize that all facility errors in the degraded active link are delivered to the end-user until the switch over to the standby link takes place. Also, it is important to realize that there exists a transient period between detection of a facility outage by switch 302 and the desired switching action. Furthermore, when a switch over to the standby link occurs, there is no compensation for the difference in propagation delay between the active link and the standby link. This arrangement of the APLS, while achieving a degree of improvement over the previously described arrangement in terms of providing higher availability of DS1 service by capitalizing on redundancy of T1 links, is still deficient in providing improvement in error performance.

Specifics of the Present Invention

Figure 4:
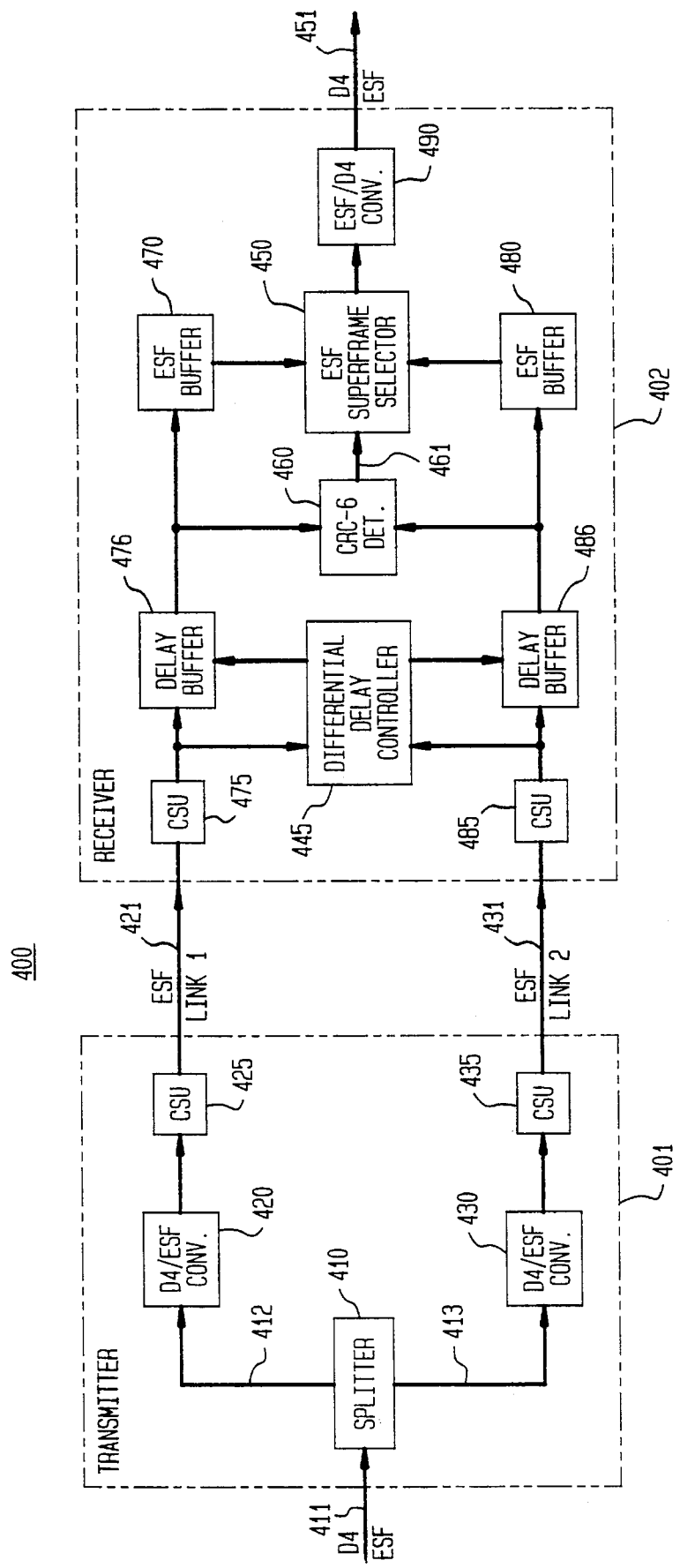
FIG. 4 is a high-level block diagram of one illustrative transmitter-receiver pair, in accordance with the present invention, for a system having route diversity.

With reference to FIG. 4, there is shown high-level block diagram 400 depicting one direction of operation of a combined transmitter-receiver pair, namely, transmitter 401 and receiver 402, in accordance with the present invention. The incoming digital stream to transmitter 401 may be either in the D4 or ESF format. Illustratively, the incoming stream is in D4 frame format (such as transmitted by DTE-A 110 in FIG. 1), and this stream is delivered, as shown in FIG. 4 via link 411, to splitter 410 in transmitter 401. Splitter 410 replicates the D4 stream to derive two separate streams in D4 format, with each replicated stream being transmitted to D4/ESF converters 420 and 430, via links 412 and 413, respectively. D4/ESF converter 420 converts the signal in D4 format on link 412 to ESF format and sends it to CSU 425. CSU 425 then propagates the derived ESF stream over T1 Link 1, that is, link 421. Similarly, D4/ESF converter 430 independently converts the signal in D4 format on link 431 to ESF format and sends it to CSU 435. CSU 435 then propagates the derived ESF stream over T1 Link 2, that is, link 431. If the incoming digital stream derived via link 411 is already in the ESF format, D4/ESF converters 420 and 430 are disabled.

Receiver 402 of FIG. 4 depicts an illustrative embodiment of "hitless" protection switching, in accordance with the present invention that also accounts for the practical but deleterious effects of unequal transmission delays on Link 1 compared to Link 2. The ESF data stream arriving on Link 1 serves as the input to CSU 475. The signal from CSU 475 enters both differential delay controller 445 and delay buffer 476. Similarly, the ESF data stream arriving on Link 2 serves as the input to CSU 485. The signal from CSU 485 enters both differential delay controller 445 and delay buffer 486.

Differential delay controller 445 is utilized to derive ESF superframe synchronization information for the two ESF data streams on Links 1 and 2. Because the data stream on the link with the shorter electrical path arrives first, there is a need to align the duplicated data streams before the streams can be compared in order to detect logic errors. Differential delay controller 445 uses both information and framing bits in the ESF superframe to determine the amount of delay to be inserted into the shorter electrical path for compensation. For instance, if Link 1 is the shorter electrical path than Link 2, then delay buffer 476 is enabled to provide the requisite delay under control of differential delay controller 445. Under these conditions, delay buffer 486 is essentially bypassed. On the other hand, if Link 2 is the shorter electrical path than Link 1, buffer 476 is bypassed and buffer 486 is enabled with appropriate delay under control of controller 445. Then, CRC-6 detector 460 independently calculates the CRC-6 bits for each ESF superframe received in link 421 and link 431 to determine whether or not there are logical errors in the superframes. In turn, CRC-6 detector 460 provides control information to ESF superframe selector 450, via lead 461. Normally, selector 450 is set to receive ESF superframes from an incoming link designated the active link, say for example link 421, meaning that link 431 is the standby link for this example. However, for both the active link and the standby link, receiver 402 is arranged so that the ESF superframes must pass through interposed delay buffer 476 and ESF buffer storage 470 and delay buffer 486 and ESF buffer storage 480, respectively. Each ESF buffer stores, at least: (1) the ESF superframe (called the "first" ESF superframe for reference purposes) for which the latest CRC-6 check bits have been calculated at receiver 402, and (2) the next ESF superframe (called the "second" ESF superframe for reference purposes) which is propagating the CRC-6 check bits as computed at transmitter 401 for comparison to the first ESF superframe CRC-6 check bits. If no logic errors are detected in link 421, then selector 450 remains in its present state, that is, ESF superframes from ESF buffer storage 470 are delivered to ESF/D4 converter 490 in ESF format. ESF/D4 converter 490 converts framing format into D4 and delivers the bit stream to outgoing link 451. ESF/D4 converter 490 is disabled if DTE-B is provisioned for ESF. If, however, detector 460 calculates logic errors in an ESF superframe on link 421 and no errors were detected in the same ESF superframe on link 431, selector 450 switches from the active link to the standby link, thereby delivering an ESF superframe from ESF buffer storage 480 to ESF/D4 converter 490 and, ultimately, in D4 format to outgoing link 451. Consequently, because ESF superframes are temporarily stored during calculations of CRC-6 check bits, error detection occurs before any ESF superframes having errors can reach the end user; unless errors are detected in both superframes: one received on link 421 and one received on link 431, only uncorrupted ESF superframes actually reach the end user because of the switching action of selector 450. The arrangement of network 400 thereby provides "hitless" DS1 service to such end users because the delay is equalized. Accordingly, a stream in D4 format is delivered to the data transmission equipment served by receiver 402. Moreover, although only one direction of propagation (i.e. right-to-left) has been discussed in detail, it is readily apparent that a bi-directional transmission system may be realized by essentially replicating the components of FIG. 4 for the other direction (i.e. left-to-right).

If links 421 and 431 are diversely routed, then error events are generally uncorrelated, and the probability of simultaneous error conditions is insignificant.

In the unusual situation wherein both links have errors, then the link which has had the better recent error performance (i.e., lower recent historical error rate) is selected by selector 450 as the active link.

Additionally, when both links are errorless, the link again with the better recent error performance is selected as the active link.

Figure 5:
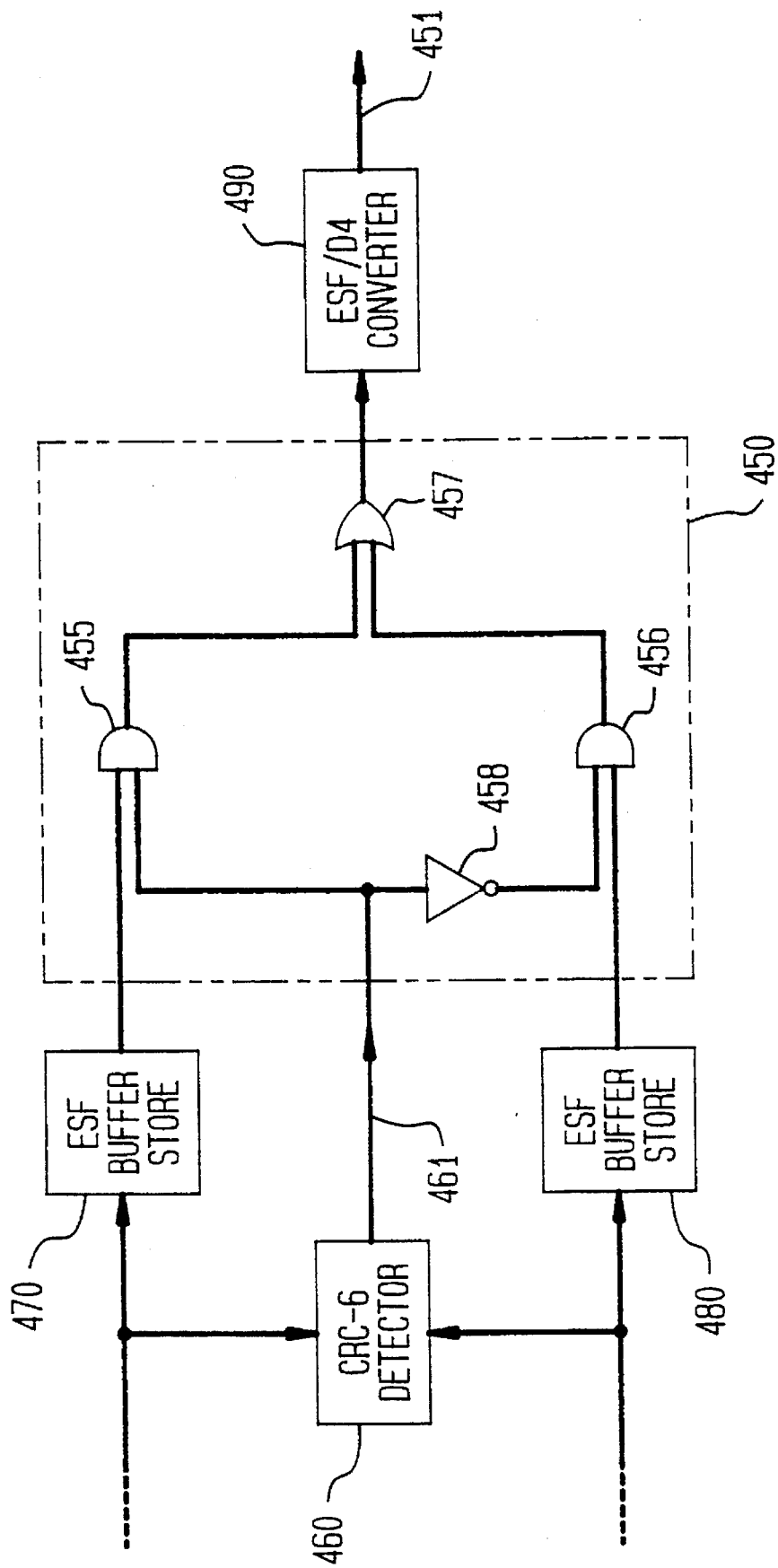
FIG. 5 is an illustrative embodiment of the ESF superframe selector of FIG. 4.

With reference to FIG. 5, an illustrative embodiment of one implementation of ESF link selector 450 of FIG. 4 is shown at the gate level. In particular, ESF buffer store 470 and CRC-6 detector 460 serve as inputs to AND gate 455, whereas ESF buffer store 480 and the inverted output, via inverter 458, from detector 460 serve as inputs to AND gate 456; the outputs of gates 455 and 456 are coupled to OR gate 457, with the output of gate 457 supplying the digital signal in ESF format to ESF/D4 converter 490 and, ultimately, to link 451 in D4 format. In operation, if it is supposed that detector 460 initially enables gate 455 and disables gate 456, then the digital bit stream emitted by ESF buffer store 470 is transmitted to OR gate 457, and in turn, to link 451, whereas any output from ESF buffer store 480 is blocked. If detector 460 determines that errors exist in an ESF superframe being buffered by store 470, and the corresponding ESF superframe is error-free in buffer store 480, then gate 455 can be disabled and gate 456 can be enabled to transmit the error-free output to ESF/D4 converter 490 via OR gate 457. Since AND gates 455 and 456 and OR gate 457 can be realized with high speed devices, the switching effected by ESF superframe selector 450 is basically transparent to buffer stores 470 and 480, so that ESF superframes can be delivered to ESF/D4 converter 490 one ESF superframe at a time (called superframe-by-superframe as a shorthand notation) under control of detector 460.

Whereas the aforementioned description has been couched in terms of a DS1 system, substantially similar circuitry and concomitant methodologies may be arranged for high speed synchronous digital services such as DS3. Currently, there are two standard DS3 formats which provide end-to-end performance monitoring capability similar to the monitoring capabilities available in the ESF DS1 format. These two DS3 formats are the SYNTRAN format which is described in the ANSI Standard T1.404-1989 entitled "Carrier-to-Customer Installation—DS3 Metallic Interface Specification" and which is incorporated herein by reference, and C-Bit Parity (CBP) format which has been defined in ANSI T1X1.4/89-017, draft ANSI documentation for CBP standard. For the sake of completeness, pertinent characteristics of the SYNTRAN and CBP formats are now presented.

The SYNTRAN format enables one-step multiplexing or de-multiplexing of DS1 signals directly to or from the DS3 level. This frees up so-called C bits in the overhead data stream which, in turn, allows for the assignment of C bits to network management such as checking for propagation errors. The SYNTRAN signal is formed by arranging 595 synchronous blocks of information, each block being 125 microseconds long, into a superframe containing 699 DS3 frames. The SYNTRAN signal provides a nine-bit error detection cyclical redundancy check (CRC-9) code which may be used in a manner similar to the CRC-6 code of the ESF superframe. Accordingly, in the description of FIG. 6 that follows, use of the term "superframe" is a short-hand notation denoting any high level digital signal system having a data stream composed of both a payload stream and an overhead stream wherein the overhead stream contains a check bit stream used to determine if there are errors in each superframe.

C-Bit Parity is an industry code name for a new DS3 format which is currently under consideration by the T1X1.4 Working Group on Metallic Hierarchy Interfaces. The format is based on a proposal by American Telephone and Telegraph Company (AT&T) to provide additional overhead channels in the DS3 format by improving the efficiency of an M13 multiplexing process. In this scheme selected control bits, known as "C" bits, contained within the frame of the DS3 signal are re-defined as parity bits, thus the term C-Bit Parity. The primary application is for end-to-end performance monitoring, a function that could not adequately be performed by the existing DS3 parity ("P") bits since, by convention, the P-bits were subject to alteration within the network.

CBP is described in the T1X1.4 draft standard as a " . . . minor modification of the two step multiplexing process normally used to multiplex DS1 channels to the DS3 level." The following is a description of how this is accomplished.

In the existing M13 multiplexer, 28 DS1s are multiplexed to the DS3 rate through an intermediate DS2 level in 7 sets of 4 DS1s each. Characteristic of each multiplex step is the inclusion of "stuff" bits to increase the aggregate bit rate of the low level signals to that of the next level. Control bits are used to mark the occurrence of the stuff bit for later removal during the de-multiplexing process. In the existing M13 multplexing process, both the DS2 and the DS3 signals contain stuff and control bits. This is true even if the DS2 level is never used as is typical in modern digital networks.

In the CBP process only one level of stuffing is required. This frees up the other set of control bits (those in the DS3 frame) for other usages. Stuffing of the DS1 signals still occurs, but now the intermediate signal is not a true DS2 level. This "pseudo-DS2" is set at a slightly higher rate than that of the standard DS2. This new rate is directly related to that of the DS3 and, consequently, does not require a second stuffing operation to develop the DS3 signal. The limitation of this approach—the loss of the DS2 modularity—is not considered unnecessarily restrictive in private line offerings.

Receiver 600 of FIG. 6 depicts, in accordance with the present invention, a generalized counterpart to receiver 402 of FIG. 4 that also accounts for the practical but deleterious effects of unequal transmission delays of any high speed service, such as that described above, utilizing Links 1 and 2 of FIG. 6. The digital signal stream having check bit information in an overhead bit stream and arriving on Link 1 serves as the input to CSU 605. The signal from CSU 605 enters both differential delay controller 645 and delay buffer 610. Similarly, the digital signal stream having check bit information in an overhead bit stream and arriving on Link 2 serves as the input to CSU 630. The signal from CSU 630 enters both differential delay controller 645 and delay buffer 635. Differential delay controller 645 is utilized to derive frame synchronization information for the two high speed data streams appearing on Links 1 and 2. Because the data stream on the link with the shorter electrical path arrives first, there is a need to align the duplicated data streams before the streams can be compared in order to detect errors in either of these streams. Differential delay controller 645 uses both information and framing bits in the frame of the high speed stream to determine the amount of delay to be inserted into the shorter electrical path for compensation. For instance, if Link 1 is the shorter electrical path, then delay buffer 610 is enabled to provide the requisite delay under control of differential delay controller 645. Under these conditions, delay buffer 635 is essentially bypassed. On the other hand, if Link 2 is the shorter electrical path, buffer 610 is bypassed and buffer 635 is enabled with appropriate delay under control of controller 645.

Figure 6:
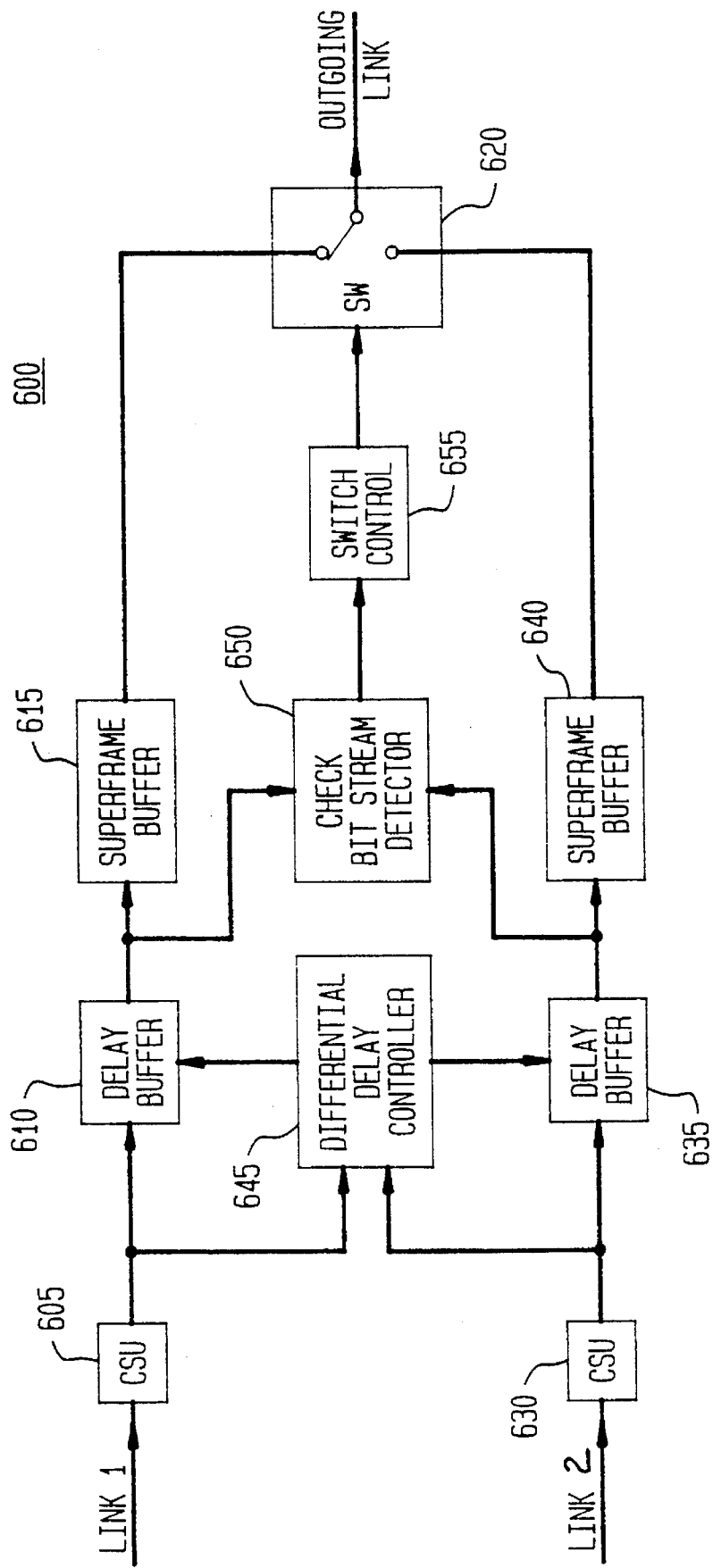
FIG. 6 is a block diagram of an illustrative embodiment of a receiver, in accordance with the present invention, for use in a high speed, synchronous digital signal system.

The remainder of the circuitry in FIG. 6 performs basically the same function as counterpart components in FIG. 4. Accordingly, the data stream emitted by delay buffer 610 serves as the input to both superframe buffer 615 and check bit stream detector 650. Similarly, the data stream emitted by delay buffer 635 serves as the input to both superframe buffer 640 and check bit stream detector 650. Frame buffers 615 and 640 are the counterparts to the ESF superframe buffers 470 and 480 in FIG. 4 and function in the same manner for the frames propagated by the high speed service. Finally, switch control 655 and switch 620 serve to select the appropriate superframe from either buffer 615 or buffer 640 depending upon the results produced by check bit stream detector 650.

Thus, the invention provides a technique that can be incorporated within illustratively a DS1 or higher speed synchronous digital service for effectively and automatically switching between active and standby links depending upon the error conditions on the links and thereby provide error-free data to digital terminating equipment.

It is to be understood that the above-described embodiment is simply illustrative of the application of the principles in accordance with the present invention. Other embodiments may be readily devised by those skilled in the art which may embody the principles in spirit and scope. Thus, it is to be further understood that the methodology described herein is not limited to the specific forms shown by way of illustration, but may assume other embodiments limited only by the scope of the appended claims.

I claim:

1. Circuitry for interconnecting either a first autonomous communication link or a second autonomous communication link to an output port, wherein each link propagates the same data stream in the Extended Superframe Format (ESF), each ESF data stream including check data for each ESF superframe, and wherein the first link propagates first ESF superframes and the second link propagates second ESF superframes, the circuitry comprising:

first means for buffering consecutive first ESF superframes and second means for buffering consecutive second ESF superframes;

means, coupled to said first and second buffering means, for aligning the first ESF superframes and the second ESF superframes to compensate for a difference in propagation delay between the first and second links so as to produce first and second aligned ESF superframes;

means, responsive to the first and second aligned ESF superframes, for sequentially detecting presence or absence of one or more first logic errors in each of the first aligned ESF superframes or of one or more second logic errors in each of the second aligned ESF superframes using the check data in the next consecutive first and second ESF superframes, respectively; and means for initially connecting the output port to said first buffering means and for switching, on a superframe basis, the output port to said second buffering means upon the presence of said first logic errors in the first aligned ESF superframe and the absence of said second logic errors in the second aligned ESF superframe to select an error-free ESF superframe and thereby provide an error-free ESF superframe to the output port.

2. The circuitry as recited in claim 1 wherein said means for connecting and switching includes means for re-connecting the output port to said first buffering means upon the presence of said second logic errors in the second aligned ESF superframe and the absence of said first logic errors in the first aligned ESF superframe.

3. The circuitry as recited in claim 1 wherein, upon the detection of both said first logic errors in the first aligned ESF superframe and said second logic errors in the second aligned ESF superframe, said means for connecting connects the output port to said second buffering means, whenever the second communication link exhibits better recent error performance than the first communication link, or said first buffering means, whenever the first communication link exhibits better recent error performance than the second communication link.

4. Circuitry for interconnecting on a superframe basis either a first autonomous communication link or a second autonomous communication link to an output port, wherein each link propagates the same data stream in the Extended Superframe Format (ESF), each ESF data stream including check data for each ESF superframe, and wherein the first link propagates first ESF superframes and the second link propagates second ESF superframes, the circuitry comprising:

first and second means for buffering the first ESF superframes, respectively;

means, coupled to said first and second buffering means, for aligning the first ESF superframes and the second ESF superframes to compensate for a difference in propagation delay between the first and second links so as to produce first and second aligned ESF superframes;

means, responsive to both the first and second aligned ESF superframes, for detecting superframe-by-superframe presence or absence of a first logic error in each of the first aligned ESF superframes and a second logic error in each of the second aligned ESF superframes using the corresponding check data; and means for connecting the output port superframe-by-superframe to said first buffering means, upon the presence of said logic error in the second aligned ESF superframe and the absence of said logic error in the first aligned ESF superframe, or to said second buffering means, upon the presence of said logic error in the first aligned ESF superframe and the absence of said logic error in the second aligned ESF superframe.

5. Circuitry for interconnecting either a first autonomous communication link or a second autonomous communication link to an output port, wherein each link propagates the same data stream in the Extended Superframe Format (ESF), each ESF data stream including superframe synchronization data and check data, and wherein the first link propagates first ESF superframes and the second link propagates second ESF superframes, the circuitry comprising:

means, coupled to both the first and second links, for aligning the first ESF superframes with the second ESF superframes to compensate for a difference in propagation delay between the first and second links so as to produce first and second aligned ESF superframes;

first means for buffer storing consecutive first aligned ESF superframes and second means for buffer storing consecutive second aligned ESF superframes;

means, responsive to both said first and second aligned ESF superframes, for detecting, on a superframe-by-superframe basis, a first logic error and a second logic error in said first and said second aligned ESF superframes, respectively, using the corresponding check data in the next consecutive first and second aligned ESF superframes, respectively; and means for initially connecting the output port to said first buffer storing means and for switching one superframe at a time the output port to said second buffer storing means upon the presence of said first logic error and the absence of said second logic error to select an error-free ESF superframe and thereby provide an error-free ESF superframe to the output port.

6. The circuitry as recited in claim 5 wherein said means for connecting and switching includes means for re-connecting the output port to said first buffer storing means, upon the presence of said logic error in the second aligned ESF superframe and the absence of said logic error in the first aligned ESF superframe.

7. The circuitry as recited in claim 5 wherein, upon the detection of said logic error in the first and second communication links, said means for connecting and switching connects the output port to said first buffer storing means, if the first communication link exhibits better recent error performance than the second communication link, or to said second buffer storing means, if the second communication link exhibits better recent error performance than the first communication link.

8. The circuitry as recited in claim 5 wherein, upon the detection of zero logic errors in both the first and second communication links, said means for connecting and switching connects the output port to said first buffer storing means, if the first communication link exhibits better recent error performance than the second communication link, or to said second buffer storing means, if the second communication link exhibits better recent error performance than the first communication link.

9. Circuitry for ESF superframe switching a terminal port from a first autonomous communication link to a second autonomous communication link, wherein each of the communication links propagates the same data stream in Extended Superframe Format (ESF), each ESF data stream including superframe synchronization data and check data, the circuitry comprising:

means for aligning the first and second autonomous links to compensate for propagation delay between the first and second links so as to produce first and second aligned ESF superframes;

means for storing the first and second aligned ESF superframes;

means for initially coupling the terminal port to said storing means;

means for sequentially detecting in each of the first aligned ESF superframes presence or absence of a first logic error in the first aligned ESF superframes using the check data from the first ESF superframes;

means for sequentially detecting in each of the second aligned ESF superframes the presence or absence of a second logic error in the second aligned ESF superframes using the check data from the second ESF superframes; and means for routing the second aligned ESF superframes from said storing means to the terminal port whenever said first logic error is present in the first aligned ESF superframes and said second aligned ESF superframes have an absence of said second logic error.

10. The circuitry as recited in claim 9 wherein said routing means comprises means for connecting, upon the detection of both said first logic error and said second logic error, the first aligned ESF superframes from said storing means to the terminal port wherever the first communication link exhibits better recent error performance than the second communication link, or the second aligned ESF superframes from said storing means to the terminal port wherever the second communication link exhibits better recent error performance than the first communication link.

11. The circuitry as recited in claim 9 wherein said routing means comprises means for connecting, upon the detection of zero first logic errors and zero second logic errors, the first aligned ESF superframes from said storing means to the terminal port, wherever the first communication link exhibits better recent error performance than the second communication link, or the second aligned ESF superframes from said storing means to the terminal port, wherever the second communication link exhibits better recent error performance than the first communication link.

12. Circuitry for interconnecting a terminal link to either first and second autonomous communication links, wherein each of the communication links propagates data in Extended Superframe Format (ESF), the ESF data stream including superframe synchronization data and check data, the circuitry comprising:
    means for aligning the first and second autonomous links to compensate for a propagation delay difference between the first and second links so as to generate first and second aligned ESF superframes;
    first and second means for storing the first and second aligned ESF superframes, respectively;
    means for determining the existence of first and second logic errors in said first aligned ESF superframe and said second ESF superframe, respectively, using the corresponding check data; and
    means, coupled to said first and second storing means, for ESF superframe switching said second aligned ESF superframe from said second storing means only when said first logic error exists in said first aligned ESF superframe and no error is detected in the second aligned ESF superframe, or for routing said first aligned ESF superframe from said first storing means only when said second logic error exists in said second aligned ESF superframe and no error is detected in the first aligned ESF superframe.

13. The circuitry as recited in claim 12 wherein said routing means couples to said first storing means whenever both the first and second aligned superframes have error(s) and the first communication link exhibits better recent error performance than said second communication link.

14. The circuitry as recited in claim 12 wherein said routing means couples to said first storing means whenever both the first and second aligned superframes have zero errors and the first communication link exhibits better recent error performance than said second communication link.

15. A method for interconnecting either a first autonomous communication link or a second autonomous link to an output port, wherein each link propagates the same data stream in the Extended Superframe Format (ESF), each ESF data stream including check data for each ESF superframe, and wherein the first link propagates first ESF superframes and the second link propagates second ESF supra-frames, the method comprising the steps of:
    storing the first ESF superframes in a first buffer and storing the second ESF superframes in a second buffer to produce consecutive first buffered ESF superframes and consecutive second buffered ESF superframes;
    aligning the first and second buffered ESF superframes to compensate for a difference in propagation delay between the first and second links and thereby produce aligned first and second superframes;
    sequentially detecting in each of the aligned ESF superframes the presence or absence of a first and second logic error in each of the first aligned ESF superframes or of a second logic error in each of the second aligned ESF superframes using the check data in the next consecutive first and second aligned ESF superframes, respectively;
    initially transmitting to the output port said first buffered ESF superframes; and
    connecting the output port to said second buffer upon the presence of said first logic error and the absence of said second logic error to select an error-free ESF superframe and thereby provide an error-free ESF superframe to the output port.

16. The method as recited in claim 15 further comprising the step of re-connecting the output port to said first buffer upon the presence of said second logic error in the second aligned ESF superframe and the absence of said first logic error in the first aligned ESF superframe.

17. The method as recited in claim 15 further comprising the step of connecting, upon the detection of both said first logic errors and said second logic errors, the output port to said second buffer, whenever the second communication link exhibits better recent error performance than the first communication link, or said first buffer, whenever the first communication link exhibits better recent error performance than the second communication link.

18. The method as recited in claim 15 further comprising the step of connecting, upon the detection of zero first logic errors and zero second logic errors, the output port to said second buffer, whenever the second communication link exhibits better recent error performance than the first communication link, or said first buffer, whenever the first communication link exhibits better recent error performance than the second communication link.

19. Circuitry for interconnecting either a first autonomous communication link or a second autonomous communication link to an output port, wherein each link propagates the same data stream in a predetermined superframe format, each data stream including check data for each superframe, and wherein the first link propagates first superframes and the second link propagates second superframes, the circuitry comprising:
    first means for buffering consecutive first superframes and second means for buffering consecutive second superframes;
    means, coupled to said first and second buffering means, for aligning the first and second superframes to compensate for a difference in propagation delay between the first and second links so as to yield first and second aligned superframes, respectively;
    means, responsive to the first and second aligned superframes, for sequentially detecting presence or absence of a first logic error in each of the first aligned superframes or a second logic error in each of the second aligned superframes using the corresponding check data in the next consecutive first and second superframes, respectively; and
    means for initially connecting the output port to said first buffering means and for switching, on a superframe basis, the output port to said second buffering means upon the presence of said first logic error in the first aligned superframe and the absence of said second logic error in the second aligned superframe to select an error-free superframe and thereby provide an error-free superframe to the output port.

20. The circuitry as recited in claim 19 wherein said connecting and switching means includes means for reconnecting the output port to said first buffering means upon the presence of said second logic error in the second aligned superframe and the absence of said first logic errors in the first aligned superframe.

21. The circuitry as recited in claim 19 wherein, upon the detection of both said first logic error in the first aligned superframe and said second logic error in the second aligned superframe, said connecting and switching means connects the output port to said second buffering means, whenever the second communication link exhibits better recent error performance than the first communication link, or said first buffering means, whenever the first communication link exhibits better recent error performance than the second communication link.

22. The circuitry as recited in claim 19 wherein, upon the detection of zero first logic errors in the first aligned superframe and zero second logic errors in the second aligned superframe, said connecting and switching means connects the output port to said second buffering means, whenever the second communication link exhibits better recent error performance than the first communication link, or said first buffering means, whenever the first communication link exhibits better recent error performance than the second communication link.

23. Circuitry for interconnecting on a superframe basis either a first autonomous communication link or a second autonomous communication link to an output port, wherein each link propagates the same data stream in a predetermined superframe format, each data stream including check data for each superframe, and wherein the first link propagates first superframes and the second link propagates second superframes, the circuitry comprising:

first and second means for buffering the first and second superframes, respectively;

means, coupled to said first and second buffering means, for aligning the first superframes and the second superframes to compensate for a difference in propagation delay between the first and second links so as to yield first and second aligned superframes;

means, responsive to both the first and second aligned superframes, for detecting, on a superframe-by-superframe basis, presence or absence of a first logic error in each of the first aligned superframes and a second logic error in each of the second aligned using the corresponding check data; and means for connecting the output port superframe-by-superframe to said first buffering means, upon the presence of said logic error in the second aligned superframe and the absence of said logic error in the first aligned superframe, or to said second buffering means, upon the presence of said logic error in the first aligned superframe and the absence of said logic error in the second aligned superframe.

24. Circuitry for interconnecting either a first autonomous communication link or a second autonomous communication link to an output port, wherein each link propagates the same data stream in a predetermined superframe format, each data stream including superframe synchronization data and check data, and wherein the first link propagates first superframes and the second link propagates second superframes, the circuitry comprising:

means, coupled to both the first and second links, for aligning the first superframes with the second superframes to compensate for a difference in propagation delay between the first and second links so as to generate first and second aligned superframes;

first means for buffer storing consecutive first aligned superframes and second means for buffer storing consecutive second aligned superframes;

means, responsive to both said first and second aligned superframes, for detecting, on a superframe-by-superframe basis, a first logic error and a second logic error in said first and said second aligned superframes, respectively, using the check data in the next consecutive first and second aligned superframes, respectively; and means for initially connecting the output port to said first means for buffer storing means and for switching one superframe at a time the output port to said second buffer storing means upon presence of said first logic error and absence of said second logic error to select an error-free superframe and thereby provide an error-free superframe to the output port.

25. The circuitry as recited in claim 24 wherein said connecting and switching means includes means for reconnecting the output port to said first buffer storing means upon the presence of said logic error in the second aligned superframe and the absence of said logic error in the first aligned superframe.

26. The circuitry as recited in claim 24 wherein, upon the detection of said logic error in the first and second communication links, said connecting and switching means connects the output port to said first buffer storing means, if the first communication link exhibits better recent error performance than the second communication link, or to said second buffer storing means, if the second communication link exhibits better recent error performance than the first communication link.

27. The circuitry as recited in claim 24 wherein, upon the detection of zero logic errors in the first and second communication links, said connecting and switching means connects the output port to said first buffer storing means, if the first communication link exhibits better recent error performance than the second communication link, or to said second buffer storing means, if the second communication link exhibits better recent error performance than the first communication link.

28. Circuitry for superframe switching a terminal port from a first autonomous communication link to a second autonomous communication link, wherein each of the communication links propagates the same data stream in predetermined superframe format, each data stream including superframe synchronization data and check data, the circuitry comprising:

means for aligning the first and second autonomous links to compensate for the propagation delay between the first and second links so as to yield first and second aligned superframes;

means for storing the first and second aligned superframes;

means for coupling the terminal port to said storing means;

first means for sequentially detecting in each of the first aligned superframes presence or absence of a first logic error in the first aligned superframes using the check data from the first superframes;

second means for sequentially detecting in each of the second aligned superframes presence or absence of a second logic error in the second aligned superframes using the check data from the second superframes; and means, operative in conjunction with said coupling means and said first and second detecting means, for routing the second aligned superframes from said storing means to the terminal port whenever said first logic error is present in the first aligned superframes and said second aligned superframes have an absence of said second logic error.

29. The circuitry as recited in claim 28 wherein said routing means comprises means for connecting, upon the detection of both said first logic error and said second logic error, the first aligned superframes from said storing means to the terminal port, wherever the first communication link exhibits better recent error performance than the second communication link, or the second aligned superframes from said storing means to the terminal port, wherever the second communication link exhibits better recent error performance than the first communication link.

30. The circuitry as recited in claim 28 wherein said routing means comprises means for connecting, upon the detection of zero first logic errors and zero second logic errors, the first aligned superframes from said storing means to the terminal port, wherever the first communication link exhibits better recent error performance than the second communication link, or the second aligned superframes from said storing means to the terminal port, wherever the second communication link exhibits better recent error performance than the first communication link.

31. Circuitry for interconnecting a terminal link to either first and second autonomous communication links, wherein each of the communication links propagates data in a predetermined superframe format, the data stream including superframe synchronization data and check data, the circuitry comprising:

means for aligning the first and second autonomous links to compensate for a propagation delay difference between the first and second links so as to yield first and second aligned superframes;

first means for storing consecutive first aligned superframes and second means for storing consecutive second aligned superframes;

means for determining the existence of first and second logic errors in said first and second aligned superframes, respectively, using the corresponding check data in the next consecutive first and second aligned superframes, respectively; and means, coupled to said first and second storing means, for switching, on a superframe basis, said second aligned superframe from said second storing means only when said first logic error exists in said first aligned superframe and no error is detected in the second aligned superframe or for routing said first aligned superframe from said first storing means only when said second logic error exists in said second aligned superframe and no error is detected in the first aligned superframe.

32. The circuitry as recited in claim 31 wherein said routing means couples to said first storing means, whenever both the first and second aligned superframes have errors and the first communication link exhibits better recent error performance than the second communication link.

33. The circuitry as recited in claim 31 wherein said routing means couples to said first storing means, whenever both the first and second aligned superframes have zero errors and the first communication link exhibits better recent error performance than said second communication link.

34. A method for interconnecting either a first autonomous communication link or a second autonomous link to an output port, wherein each link propagates the same data stream in a predetermined superframe format, each data stream including check data for each superframe, and wherein the first link propagates first superframes and the second link propagates second superframes, the method comprising the steps of:

storing the first and second superframes in first and second buffers to produce first and second buffered superframes, respectively;

aligning the first and second buffered superframes to compensate for the difference in propagation delay between the first and second links so as to yield first and second aligned superframes;

sequentially detecting in each of the first and second aligned superframes the presence or absence of a first logic error in each of the first aligned superframes or a second logic error in each of the second aligned superframes using the corresponding check data in the first and second aligned superframes, respectively;

initially transmitting to the output port said first buffered superframes; and connecting the output port to said second buffer upon the presence of said first logic error and the absence of said second logic error to select an error-free superframe and thereby provide an error-free superframe to the output port.

35. The method as recited in claim 34 further comprising the step of re-connecting the output port to said first buffer upon the presence of said second logic error in the second aligned superframe and the absence of said first logic error in the first aligned superframe.

36. The method as recited in claim 34 further comprising the step, upon the detection of both said first and second logic errors, of connecting the output port to said second buffer whenever the second communication link exhibits better recent error performance than the first communication link, or said first buffer, whenever the first communication link exhibits better recent error performance than the second communication link.

37. The method as recited in claim 34 further comprising the step, upon the detection of zero first logic errors and zero second logic errors, of connecting the output port to said second buffer whenever the second communication link exhibits better recent error performance than the first communication link, or said first buffer, whenever the first communication link exhibits better recent error performance than the second communication link.

* * * * *